US009001046B2

(12) United States Patent
Kim

(10) Patent No.: US 9,001,046 B2
(45) Date of Patent: Apr. 7, 2015

(54) MOBILE TERMINAL WITH TOUCH SCREEN

(75) Inventor: Tae Hun Kim, Incheon (KR)

(73) Assignee: LG Electronics Inc., Seoul (KR)

( * ) Notice: Subject to any disclaimer, the term of this patent is extended or adjusted under 35 U.S.C. 154(b) by 876 days.

(21) Appl. No.: 11/746,124

(22) Filed: May 9, 2007

(65) Prior Publication Data
US 2008/0174561 A1 Jul. 24, 2008

(30) Foreign Application Priority Data

Jan. 19, 2007 (KR) .................. 10-2007-0006333

(51) Int. Cl.
G06F 3/041 (2006.01)
G09G 5/00 (2006.01)
G06F 3/0488 (2013.01)

(52) U.S. Cl.
CPC .......... G06F 3/04883 (2013.01); G06F 3/0488 (2013.01)

(58) Field of Classification Search
USPC ................................. 345/156–184
See application file for complete search history.

(56) References Cited

U.S. PATENT DOCUMENTS

| | | | |
|---|---|---|---|
| 5,459,796 A | 10/1995 | Boyer | |
| 6,646,633 B1 | 11/2003 | Nicolas | |
| 6,909,439 B1 | 6/2005 | Amro et al. | |
| 7,020,269 B1* | 3/2006 | Park et al. | 379/355.01 |
| 7,441,207 B2 | 10/2008 | Filner et al. | |
| 2002/0075317 A1 | 6/2002 | Dardick | |
| 2003/0016873 A1 | 1/2003 | Nagel et al. | |
| 2003/0071850 A1 | 4/2003 | Geidl | |
| 2003/0095135 A1 | 5/2003 | Kaasila et al. | |
| 2003/0103066 A1 | 6/2003 | Sigl | |
| 2004/0165009 A1 | 8/2004 | Blakely et al. | |
| 2004/0210853 A1 | 10/2004 | Detter | |
| 2005/0012723 A1 | 1/2005 | Pallakoff | |
| 2005/0022130 A1* | 1/2005 | Fabritius | 715/739 |
| 2005/0039137 A1 | 2/2005 | Bellwood et al. | |
| 2005/0052434 A1 | 3/2005 | Kolmykov-Zotov et al. | |
| 2005/0091577 A1 | 4/2005 | Torres et al. | |
| 2005/0219226 A1* | 10/2005 | Liu et al. | 345/173 |

(Continued)

FOREIGN PATENT DOCUMENTS

| | | |
|---|---|---|
| CN | 1170329 | 1/1998 |
| CN | 1614545 | 5/2005 |

(Continued)

OTHER PUBLICATIONS

European Patent Office Application Serial No. 08000852.7, Search Report dated Dec. 20, 2012, 9 pages.

(Continued)

Primary Examiner — Jonathan Horner
Assistant Examiner — David Tung
(74) Attorney, Agent, or Firm — Lee, Hong, Degerman, Kang & Waimey

(57) ABSTRACT

A mobile terminal having a touch screen is disclosed. The terminal includes a touch input unit and a control unit. The touch input unit provides a touch input area for inputting data information, a display area for displaying the input data information and a control region for inputting control commands, wherein the touch input area overlaps with the display area and/or the control region. The control unit controls the input and display of the information through the touch input and display area according to the control commands input through the control region.

17 Claims, 18 Drawing Sheets

(56) References Cited

U.S. PATENT DOCUMENTS

| | | |
|---|---|---|
| 2005/0233785 A1* | 10/2005 | Park et al. .................. 455/575.4 |
| 2006/0010400 A1* | 1/2006 | Dehlin et al. .................. 715/856 |
| 2006/0033724 A1 | 2/2006 | Chaudhri et al. |
| 2006/0239561 A1 | 10/2006 | Huapaya et al. |
| 2006/0262102 A1 | 11/2006 | Lee |
| 2008/0104537 A1 | 5/2008 | Scott |

FOREIGN PATENT DOCUMENTS

| | | |
|---|---|---|
| EP | 1536316 | 6/2005 |
| KR | 10-2000-0060799 | 10/2000 |
| KR | 10-2005-0107237 | 11/2005 |
| KR | 10-2006-0008089 | 1/2006 |
| KR | 10-2006-0028787 | 4/2006 |
| TW | I221253 | 9/2004 |
| WO | 0237254 | 5/2002 |
| WO | 02/088979 | 11/2002 |

OTHER PUBLICATIONS

U.S. Appl. No. 13/777,809, Notice of Allowance dated May 28, 2013, 10 pages.

Taiwan Intellectual Property Office Application Serial No. 097102102, Office Action dated Dec. 16, 2013, 11 pages.

\* cited by examiner

MOBILE TERMINAL WITH TOUCH SCREEN

CROSS REFERENCE TO RELATED APPLICATION

Pursuant to 35 U.S.C. §119(a), this application claims the benefit of earlier filing date and right of priority to Korean Patent Application No. 10-2007-0006333, filed Jan. 19, 2007, the contents of which are hereby incorporated by reference herein in its entirety.

FIELD OF THE INVENTION

The present invention is directed to a touch type information input terminal and a method of use.

DISCUSSION OF THE RELATED ART

Recently, a digital portable terminal has expanded its functions as an information processing device, such as a Personal Digital Assistance, in addition to general functions as a mobile communication terminal.

The additional functions, such as the information processing device may include a telephone directory function, a schedule management function, and a personal information management function.

These additional functions require the digital portable terminal to have character inputs in various types and forms. The digital portable terminal thus has been equipped with a touch input device for easy input of information including character inputs. The touch input device inputs data from a user and further displays the inputted data.

Moreover, the digital portable terminal includes control buttons separated from the touch input device for setting options such as sizes, types or colors of displayed objects and further for selecting menus.

Therefore, the size of the touch input device has been limited due to the requirement of the separate control buttons on the small sized body of the digital portable terminal.

SUMMARY OF THE INVENTION

An object of the present invention is to provide a touch type information input terminal and a method of use for inputting and displaying information data, Additional advantages, objects and features of the invention will be set forth in part in the description which follows and in part will become apparent to those having ordinary skill in the art upon examination of the following or may be learned from practice of the invention.

In an aspect of the present invention, a method of controlling display in a mobile terminal comprising a touch screen having a display area that operates as a touch input area is provided. The method includes displaying user inputted data information in the display area, wherein the data information is distinguished with graphic icons displayed in a control region of the display area for controlling the data information; and adapting the touch input area during a data input mode to recognize a first touching manner in at least part of the control region of the display area as data information. It is contemplated that the first touching manner comprises writing on the display area.

It is contemplated that the method further includes adapting the touch input area during a data input mode to recognize a second touching manner in the control region of the display area as activation of control function associated with touched graphic icons. It is further contemplated that the second touching manner comprises one of depressing the control region for a predetermined period and for multiple times.

It is contemplated that the method further includes displaying an instruction prompt during the input mode to provide user guidance in the form of at least one of a pop-up message and cursor. It is further contemplated that the step of adapting the touch input area further comprises recognizing a starting touch point of the first touching manner in a data input area and using the control region of the display area as additional data input area.

It is contemplated that the control region of the display area is used as controlling a mobile terminal operation when user inputted data information is not detected for a predetermined period.

It is contemplated that the method further includes prompting an informative message when the first touching manner is not recognized by the mobile terminal.

In another aspect of the present invention, a mobile terminal is provided. The mobile terminal includes a touch input unit for inputting data information through a user's touch, a display area adapted to operate as a touch input area displaying the user inputted data information, and a control unit for controlling a control region of the display area having graphic icons for controlling input and display of the data information, wherein during a data input mode the touch input area is adapted to recognize a first touching manner in at least part of the control region of the display area as data information It is contemplated that the first touching manner comprises writing on the display area. It is further contemplated that during a data input mode, the input area is adapted to recognize a second touching manner in the control region of the display area as activation of a control function associated with a touched graphic icon. It is even further contemplated that the second touching manner comprises one of depressing the control region for a predetermined period and for multiple times.

It is contemplated that during the data input mode the control unit displays an instruction prompt to provide the user guidance in the form of at least one of a pop-up message and cursor. It is further contemplated that the touch input area is adapted to recognize a starting point of the first touching manner in a data input area and using the control region of the display as additional data input area.

It is contemplated that the input device further includes an indicator area for displaying an antenna reception power level, a battery capacity level and a message reception indicator. It is further contemplated that the controller displays a cursor at a touched point of the touch input area if a time period for the touched point being pushed down is shorter than a predetermined threshold.

It is contemplated that the controller displays a plurality of menus for setting sizes, types and colors of the information to be displayed at the display area in accordance with a touch input from the control region.

It is contemplated that the control region of the display area is used as controlling a mobile terminal operation when user inputted data information is not detected for a predetermined period. It is further contemplated that the controller displays an error sign when the first touching manner is not recognized by the mobile terminal.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
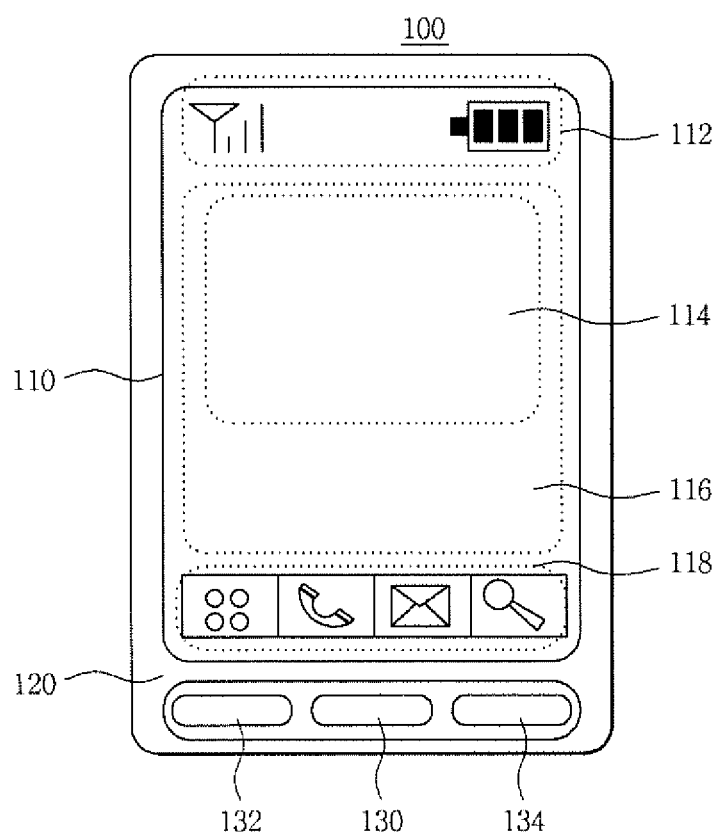
FIG. 1 is a schematic front view of a touch type information input terminal according to an embodiment of the present invention.

The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

Embodiments of the present invention will be described in detail with reference to the accompanying drawings.

FIG. 1 is a schematic front view of a touch type information input terminal according to an embodiment of the present invention. Referring to FIG. 1, the touch type information input terminal 100 comprises a touch input unit 110, a body 120, a power button 130, and reserve buttons 132 and 134.

The touch input unit 110 includes an indicator area 112, a display area 114, an input area 116, and a control area 118.

The touch input unit 110 is an input device using a touch sensing technique, such as a touch screen, which may input information through a user's touch. Further, the touch input unit 110 may display the inputted information and an outcome for an operation of each application. Here, the information includes numbers, signs, characters, images, audios, and moving pictures.

Furthermore, the touch input unit 110 sends the information inputted through the user's touch to the control unit within the body 120. The control unit 220 analyses the information from the touch input unit 110 to recognize a shape consisting of touched points, thereby displaying the recognized shape at the display area 114.

The power button 130 turns on/off a power of the information input terminal 100. The power button 130 is disposed at a front surface of the terminal 100; however, the power button 130 may be disposed at another position, such as a side surface of the terminal 100.

The reserve buttons 132 and 134 are for inputting control commands to execute predetermined functions or for selecting functions to be performed from the menus. Each of the reserve buttons 132 and 134 may be a general key button, or may be implemented as a part of the touch input unit 110 to input information through a user's touch.

The indicator area 112 displays information such as reception power level of an antenna, the remaining battery capacity and a message reception.

The sizes or positions displayed of the input area 116, the display area 114 and the control area 118, respectively, may be changed according to a specific screen displayed. Depending on the specific application displayed, at least one of the previously mentioned areas may not be displayed on the touch input unit 110.

The input area 116 of the touch input unit 110 may be configured to overlap with the display area 114 or the control area 118. For example, the input area 116 may overlap with the whole display area 114. In this example, the input area 116 may be as large as, or larger than, the display area 114.

Alternatively, a part or the whole input area 116 may overlap with the display area 114. In this case, the input area 116 may be as large as, larger or smaller than the display area 114. The input area 116 may overlap with the whole of the control area 118. In this case, the input area 116 may be as large as, or larger than, the control area 118.

Alternatively, a part or the whole of the input area 116 may overlap with the control area 118. In this case, the input area 116 may be as large as, smaller or larger than the control area 118.

Furthermore, the input area 116 may overlap with the whole of the display area 114 and the control area 118. In this case, the input area 116 may be as large as, or larger than, the display area 114 and the control area 118.

The input area 116 receives input points touched by cursive script writing as information, and the display area 114 displays the input information from the input area 116 or an operation status of the terminal 100.

The control area 118 provides menus for setting sizes, types and colors of the information input from the input area 116, and also provides menus for setting sizes, types and colors of the information to be output to the display area 114. Furthermore, the control area 118 may provide menus for executing applications. For example, the control area 118 may provide menus such as a send menu (📞), an e-mail/Message menu (✉), a search menu (🔍), and other menus (⋮⋮) as shown in FIG. 1.

Moreover, the control area 118 may be provided as a part of the input area 116. For example, the control area 118 may be included in the input area 116 so that the input area 116 may occupy the whole area of the touch input unit 110, including the control area 118.

In this example, the control area 118 may be adapted to be used as an additional data input area if the data input is started from a point of the input area 116 and extended into the control area 118. The control area 118 may further be adapted to be used as controlling operations of the terminal through the above described menus when data input is not detected for a predetermined period.

On the other hand, the control area 118 may be provided at a different position from the input area 116. That is, the control area 118 may be separated from the input area 116 so that the input area 116 may occupy the whole area of the touch input unit 110, except the control area 118.

Figure 2:
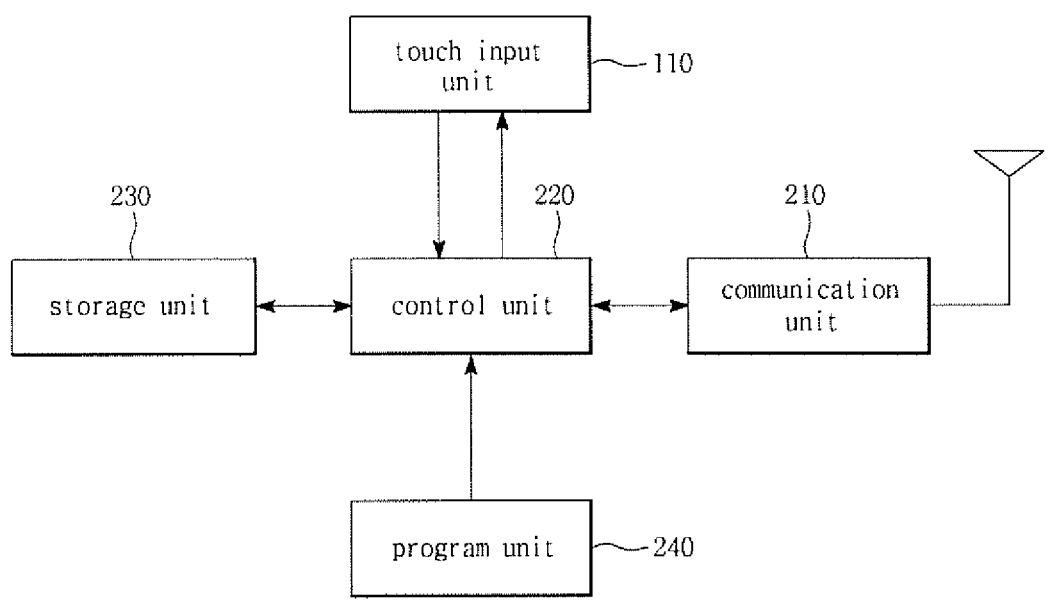
FIG. 2 is a schematic block diagram of the touch type information input terminal according to the embodiment of the present invention.

FIG. 2 is a schematic block diagram of the touch type information input terminal according to the embodiment of the present invention. Referring to FIG. 2, the information input terminal 100 further comprises a communication unit 210, a control unit 220, a storage unit 230, and a program unit 240.

As described above, the touch input unit 110 may input an information command or an operation command through touching the input area 116 by a user. The touch input unit 110 may display the input information or an outcome of an operation of each application in accordance with a command from the control unit 220 on the display area 114.

If the terminal 100 is a mobile terminal, the communication unit 210 transmits and receives data of voice signals and multimedia via a phone call through a mobile communication network.

The control unit 220 is preferably a processor that performs control operations with respect to inputs and displays of information, such as control of the touch input unit 110 to input information from a user though the input area 116 and to display the information on the display area 114. The control operations, with respect to the information input and display of information, may include settings of sizes, types and colors of the information input from the input area 116 and settings of sizes, types and colors of the information output to the display area 114.

The storage unit 230 is preferably a memory that stores various types of images or icons, and also stores the information input from the touch input unit 110 by the user.

The program unit 240 stores programs according to a sign/character recognition algorithm for recognizing the information input from the touch input unit 110 as a sign or a character. Furthermore, the program unit 240 stores a general operating system (OS) and a threshold of a time period for the touch input unit 110 to be pushed down by the user.

When a time period of the touch input unit 110, being pushed down at the touched point, is shorter than the threshold, the control unit 220 inserts a cursor at a touched point of the input area 116.

On the other hand, when a time period of the touch input unit 110, being pushed down at the touched point is longer than the threshold, the control unit 220 inputs information according to the touched point.

Figure 3:
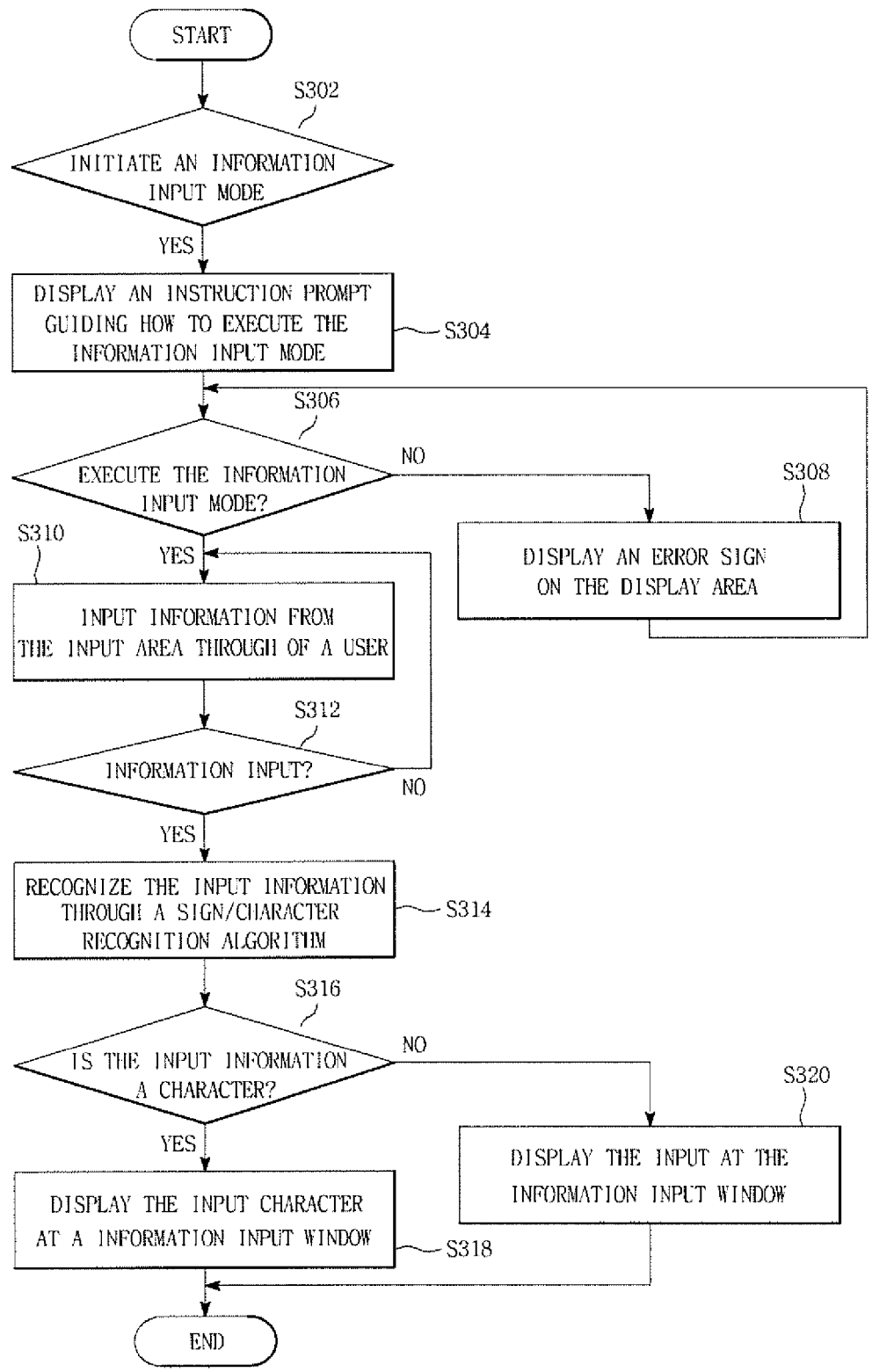
FIG. 3 is a flow chart illustrating an information input method of the touch information input terminal according to the embodiment of the present invention.

FIG. 3 is a flow chart illustrating a method for inputting information using the touch type information input terminal 100 according to the embodiment of the present invention.

Figure 4:
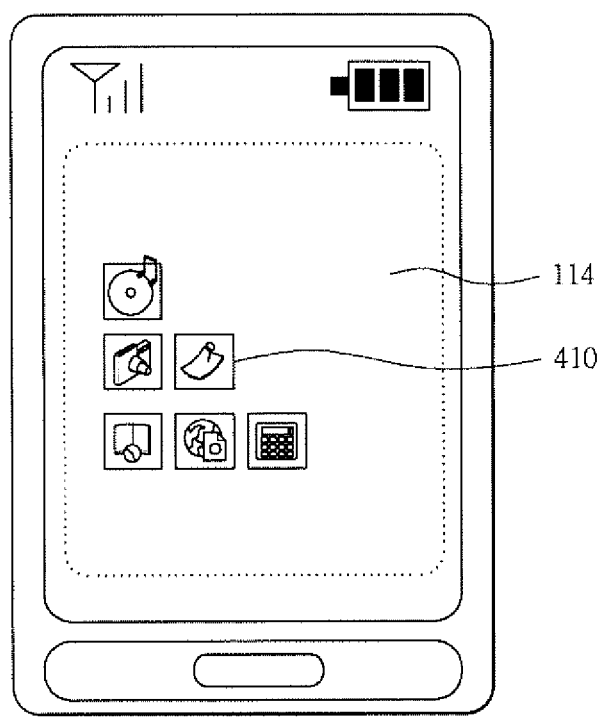
FIG. 4 illustrates an initial screen of the touch type information input terminal.

The power of the information input terminal 100 is turned on when a user pushes down the power button 130 disposed on the terminal 100. Accordingly, the general OS program is loaded at the information input terminal 100 wherein an initial screen of the terminal 100 is displayed on the display area 114 as shown in FIG. 4. In FIG. 4, the initial screen of the terminal 100 provides the display area 114 with a plurality of icons to execute corresponding applications. Here, the icons may include an application icon 410 for an application enabling an input of cursive scripts by a user in relation to applications such as a SMS mail sending application, a schedule managing application, or memo writing application.

In the embodiment of the present invention, the information input terminal 100 is switched into an information input mode when the application icon 410 is touched by a user. The information input mode includes an input mode through a user's touch or through a keypad provided at the display area 114.

The control unit 220 of the information input terminal 100 initiates the information input mode when the application icon 410 is selected out of the plurality of icons provided on the display area 114 (S302). At this time, the control unit 220 displays an instruction prompt informing the user which region of the touch input unit 110 has to be touched to activate the information input mode at the initial screen of the information input mode (S304).

The instruction prompt sign may also be displayed to guide and inform the user which region of the touch input device has to be touched to input data and proceed to the next step at a specific screen.

The instruction prompt may be displayed as a pop up window. Alternatively, as illustrated in FIG. 5, the instruction prompt may be displayed at an information input window 510 wherein the information input window 510 is provided at a predetermined position of the touch input unit 110, for example, an upper part of the information input window, to display information inputted through the input area 116.

Figure 5:
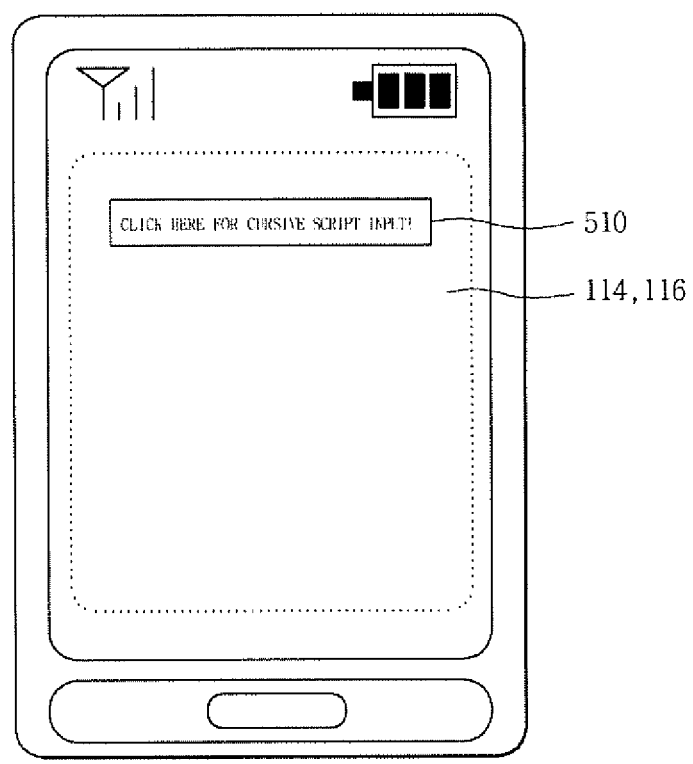
FIG. 5 illustrates an initial screen of an information input mode displaying a notification message through an information input window.

FIG. 5 illustrates an initial screen of the information input mode for displaying an informing sign at the information input window. As illustrated in FIG. 5, the control unit 220 may display at the display area 114 an informative phrase, such as "Click here for cursive script input", for guiding a user to activate the information input mode. At FIG. 5, the display area 114 is as large as the input area 116.

The control unit 220 may display the instruction prompt in a form of a blink, a color, a text, or an icon at the touch input unit 110.

When the information input window 510 provided on the display area 114 is touched by the user (S306), the control unit 220 activates the information input mode to input information through the input area 116.

On the contrary, the control unit 220 displays an error sign on the display area 114 of the touch input unit 110 to inform that the information input mode cannot be activated when a region other than the information input window 510 is touched (S308).

For example, the control unit 220 may display the error sign in the way of a blink, a color change, a text, or an icon. The control unit 220 may also display the error sign at a pop up window on the display area 114.

After displaying the error sign, the control unit 220 displays an informing sign at the display area 114 to guide a user to touch the information input window 510 for executing the information input mode, and emphasizes an object to be touched, that is, the information input window 510 through a blink or a color change.

Next, the control unit 220 inputs information from the input area 116 of the touch input unit 110 which is touched by the user (S310).

Alternatively, the control unit 220 may have the user input information through a keypad, such as a QWERTY type keypad, displayed at the display area 114 when a menu for the keypad input is touched out of the plurality of menus at the control area 118.

When a time period for the touch input unit 110 being pushed down at the touched point is shorter than the threshold time period, the control unit 220 inserts a cursor at a touched point of the input area 116 for indicating the information input position.

On the contrary, when the time period for the touch input unit 110 being pushed down at the touched point is longer than the threshold time period, the control unit 220 inputs information according to touched points being determined as cursive script input.

Figure 6:
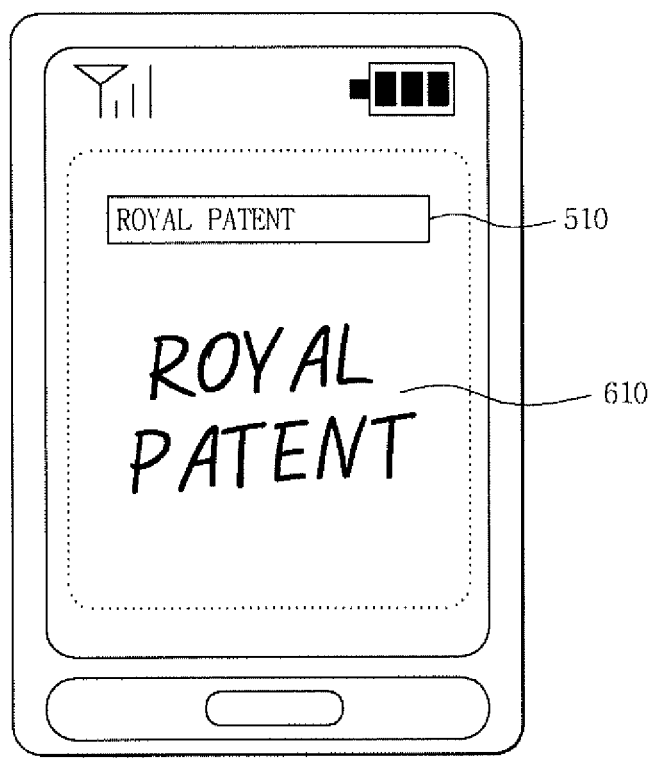
FIG. 6 illustrates a screen for inputting cursive script characters to display the recognized characters through the information input window.

The user may input information, for example, the words "ROYAL PATENT" 610, as shown in FIG. 6, through a touch of a fingertip or a guide stick/stylus on the input area 116. FIG. 6 is a screen for inputting cursive script characters to display the recognized characters through the information input window.

When the information is input from the input area 116 through the touch of the user (S312), the control unit 220 determines whether the input information is a character using the sign/character recognition algorithm (S314).

For example, the control unit 220 determines whether the touched points of the input area 116 form a character or a sign.

When the input information is determined to correspond to a character (S316), the control unit 220 displays the input character at the information input window 510 as shown in FIG. 6 (S318). Therefore, the user can check that the inputted character is what was intended to be input through the information displayed at the information input window 510.

The control unit 220 may provide the touch input unit 110 with menus for setting options, such as sizes, types and colors of the input information in accordance with the user's touch input on the control area 118. Thus, the user can set sizes, types or colors of a sign or a character to be input through the menus of the control area 118.

Moreover, the control unit 220 may provide the control area 118 with menus for setting options, such as sizes, types and colors of the information to be displayed at the touch input unit 110. Thus, the user can set sizes, types or colors of the information to be displayed at the display area 114 through the menus of the control area 118.

Figure 7A:
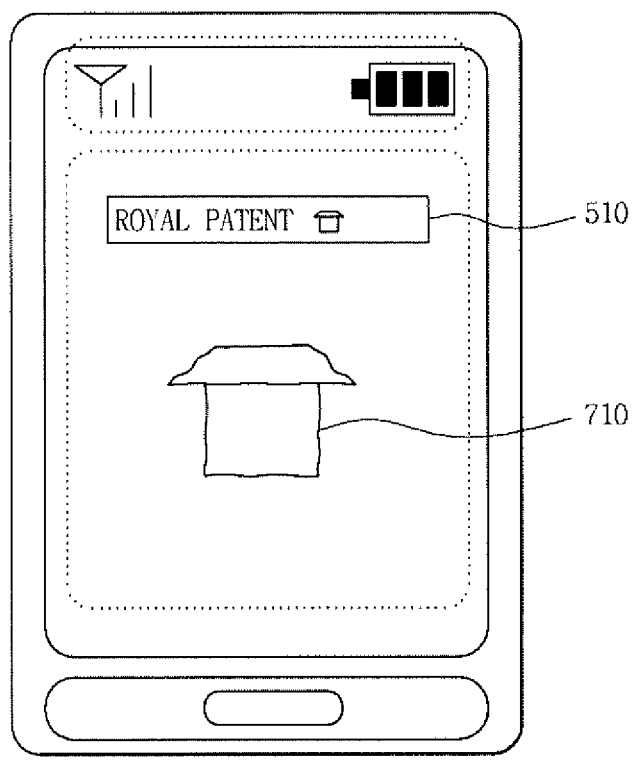
FIG. 7a illustrates a screen for inputting a drawing of a user to display the recognized drawing through the information input window.

FIG. 7a illustrates a screen for inputting a drawing of a user to display the recognized drawing on the information input window 510. As shown in FIG. 7, the user can input a drawing 710 through the input area 116 of the touch input unit 110.

When the information is input from the input area 116 by the user's touch, the control unit 220 determines whether the input information is a character using the sign/character recognition algorithm.

If the control unit 220 determines that touched points of the input area 116 do not form a sign or a character, the control unit 220 then recognizes the input information as a picture or an image and then displays the input picture or the image at the information input window 510 (S320). For example, if the information corresponds to a picture or an image stored at the storage unit 230, the corresponding picture or the image is retrieved from the storage unit 230 to be displayed at the information input window 510.

Herein, the user can input images in addition to characters. Furthermore, images to be input can be freely drawn by the user and do not have to be standard images provided by the terminal 100.

The control unit 220 may store the input image at the storage unit 230 when the information input from the input area 116 is recognized as the image. These images may include an image described using a vector technique which is not deformed when shortened.

Upon displaying the image input through the input area 116, together with the characters, as shown in FIG. 7a, the control unit 220 may display the image to having the same size characters or having a different size according to a selection from the menus of the control area 118. Furthermore, the control unit 220 may set colors of the image to be displayed at the information input window 510 according to a user's selection of the menus from the control unit 118.

Figure 7B:
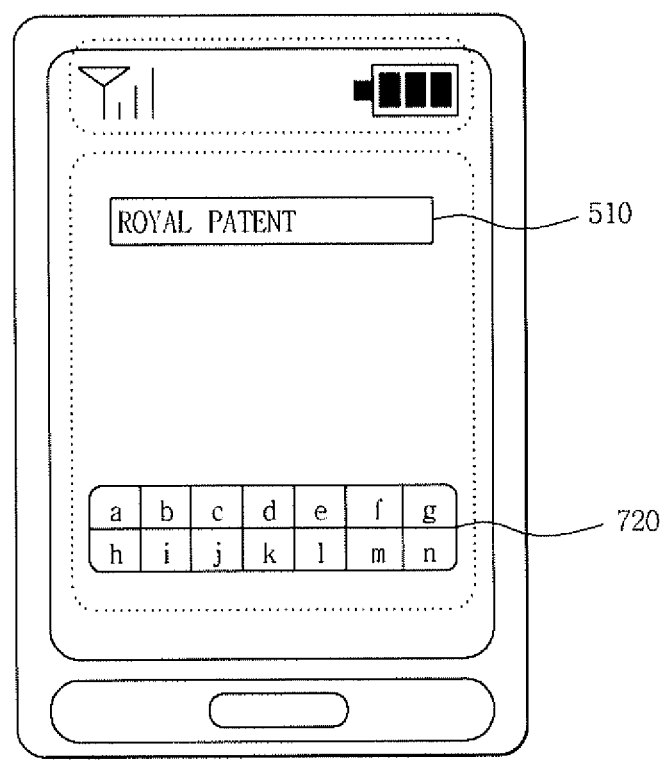
FIG. 7b illustrates a screen for inputting information through a keypad to display the information on the information input window.

FIG. 7b illustrates a screen for inputting information through a keypad to display the information at the information input window. Referring to FIG. 7b, the control unit 220 displays a keypad 720 at the display area 114 to input information when the menu for the keypad input is touched from the plurality of menus of the control area 118. Thus, the user can input characters such as "ROYAL PATENT" through the keypad 720.

Figure 8:
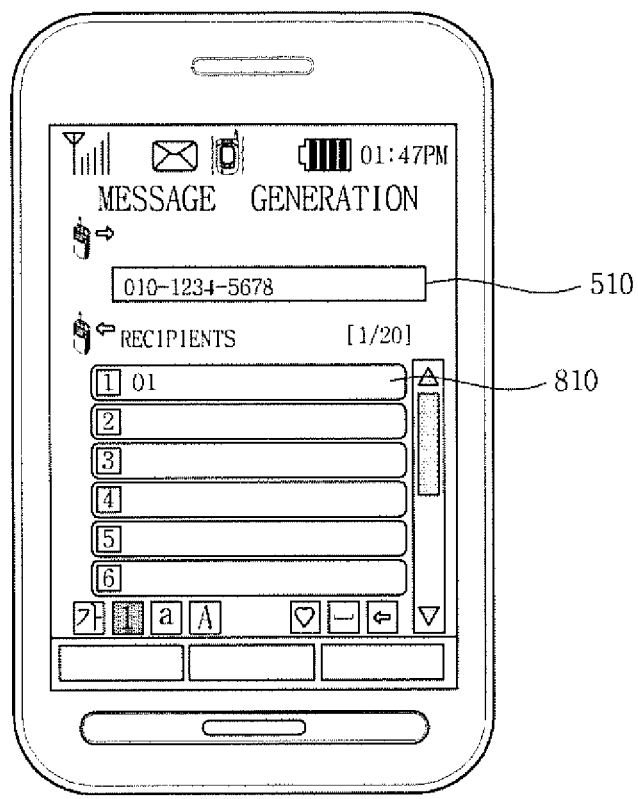
FIG. 8 illustrates a screen for inputting a number of a recipient when sending a message.

FIG. 8 illustrates a screen for inputting a recipient number through cursive scripts upon sending a message. Referring to FIG. 8, the user inputs a message recipient's number through cursive scripts at a recipient number input window 810, when the user wants to send the massage through Short Message Service (SMS), Multimedia Message Service (MMS) or E-mail service.

For example, if the user inputs information "010-1234-5678" in cursive scripts at the recipient number input window 810, as shown in FIG. 8, then the control unit 220 recognizes the information, "010-1234-5678" input through the recipient number input window 810 as numbers using the sign/character recognition algorithm. The control unit 220 then displays the recognized number "010-1234-5678" at the information input window 510.

Figure 9:
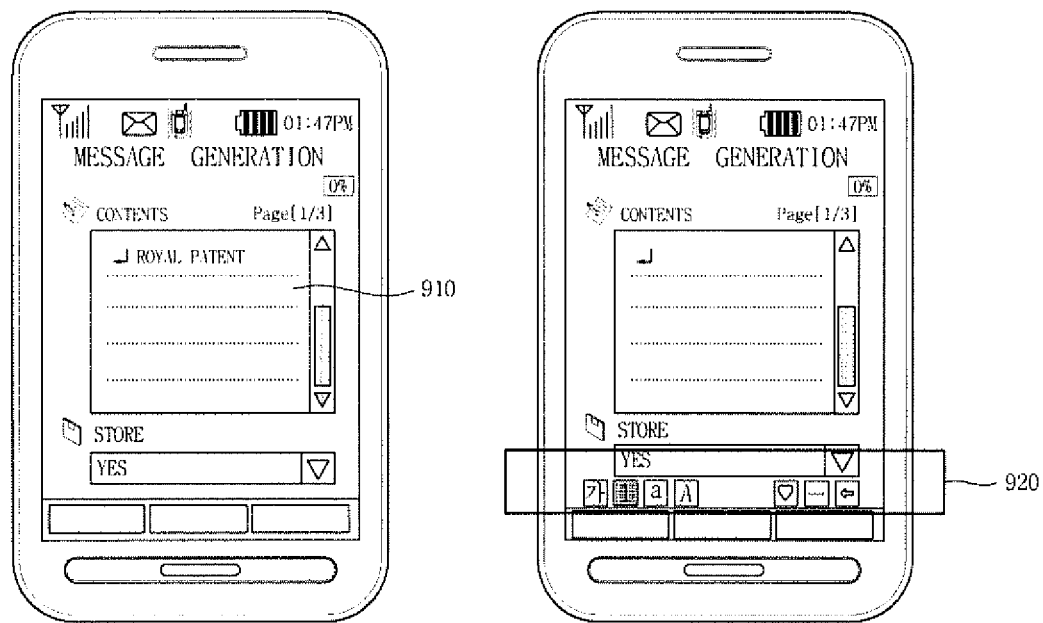
FIG. 9 illustrates a screen for inputting contents of the message in cursive scripts.

FIG. 9 illustrates a screen for inputting contents of the message through cursive scripts upon sending a message. Referring to FIG. 9, the user can input contents of a message through cursive scripts at a message input window 910 when the user sends the massage through SMS, MMS or E-mail service.

For example, if the user inputs information "ROYAL PATENT" in cursive scripts at the message input window 910, as shown in FIG. 9, then the control unit 220 recognizes the information, "ROYAL PATENT", input at the message input window 910 in cursive scripts as characters using the sign/character recognition algorithm.

Alternatively, if a drawing of the user in cursive scripts is input, then the control unit 220 recognizes the drawing as an image since the drawing is not recognized as a number or a character through the sign/character recognition algorithm.

The user can set sizes, types or colors of input contents the message and input special characters using the plurality of the control buttons displayed at a control area 920. Thus, the control unit 220 transforms the input contents of the message according to the selections of the control buttons at the control area 920.

Figure 10A:
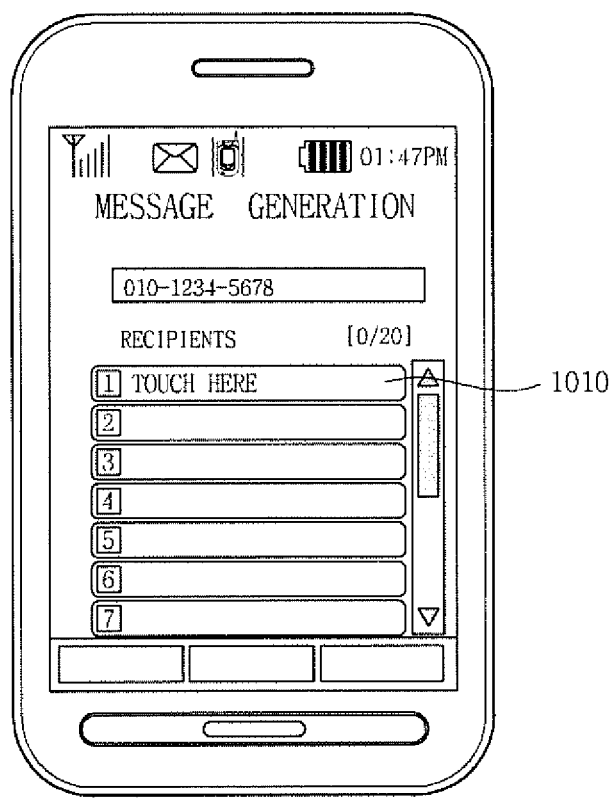
FIGS. 10a to 10d illustrate message generation screens.
Figure 10B:
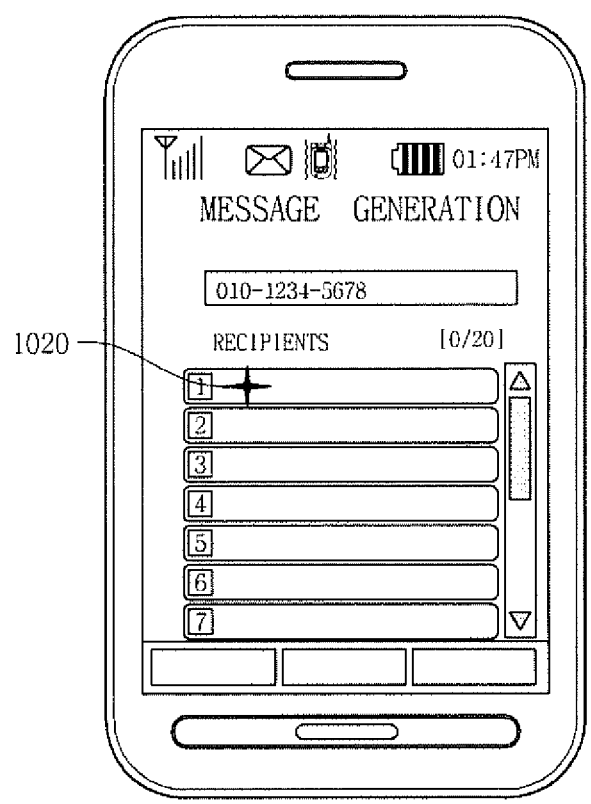

FIGS. 10a to 10b are screens for guiding a writing of a message. Referring to FIG. 10a, the control unit 220 displays an instruction phrase 1010 that goes, for example, "TOUCH HERE" to guide the user to an area to be touch for touch input when a recipient input mode is initiated by the user.

Figure 10C:
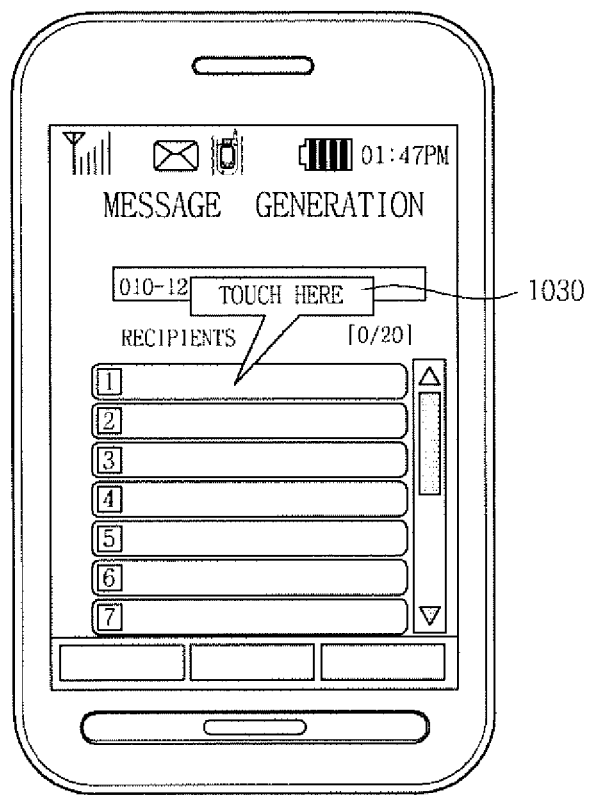
Figure 10D:
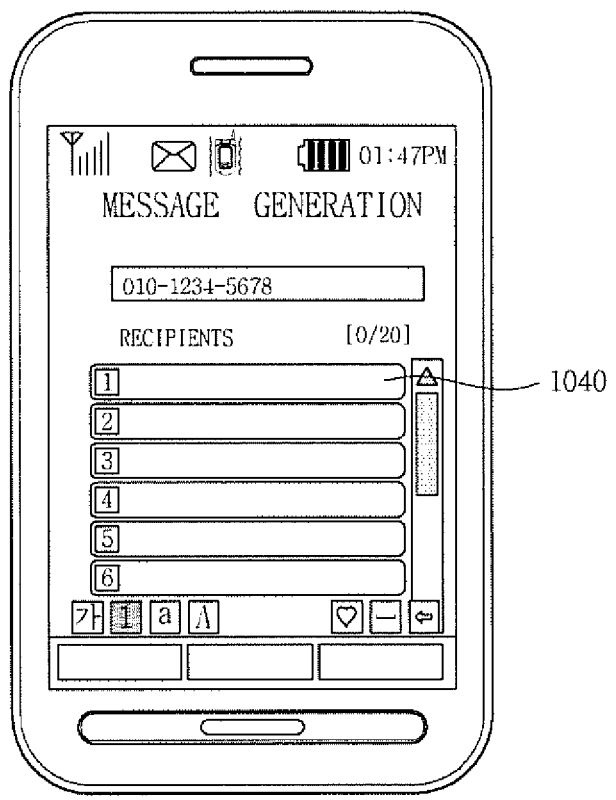

In practice, when the instruction phrase 1010 is touched by the user, the control unit 220 activates a recipient number input window 1040 for inputting a recipient number as shown in FIG. 10d. Therefore, the user can input a recipient number by writing cursive scripts through the recipient number input window 1040.

Alternatively, the control unit 220 may display a blinking cursor 1020 to guide the user to an area to be touched for touch input. Therefore, the user can touch the blinking cursor 1020 at the screen for inputting the recipient number, and accordingly the control unit 220 activates the recipient number input window 1040 as shown in FIG. 10d.

Furthermore, the control unit 220 may display a pop up window 1030 to guide the user to an area to be touched for touch input. The control unit 220 may display the pop up window 1030 to have content, such as "TOUCH HERE", as shown in FIG. 10c. Therefore, the user can touch the pop up window 1030 at the screen for inputting the recipient number, and accordingly the control unit 220 activates the recipient number input window 1040, as shown in FIG. 10d. Moreover, the user can input a recipient number by writing cursive scripts through the recipient number input window 1040.

Figure 11:
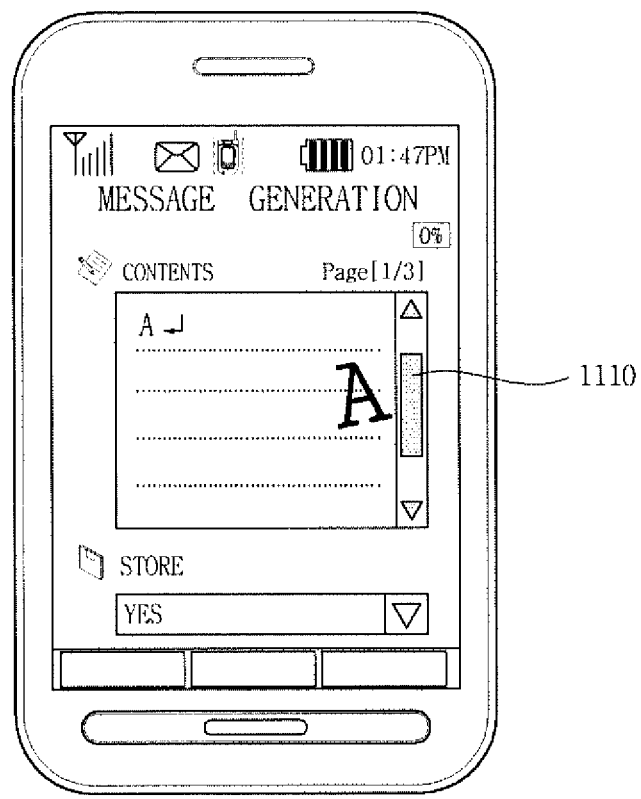
FIG. 11 illustrates a written character extended beyond a displayed input area into a scroll bar area.

FIG. 11 illustrates a written input letter that extends beyond a display area into a scroll bar area 1110 upon sending a message. Referring to FIG. 11, the control unit 220 displays an example of a written script that is extended beyond a displayed input area into a scroll bar area 1110 during cursive script writing of the contents of a message of the SMS, MMS, or E-mail service.

For example, the control unit 220 may recognize the information written across the scroll bar area 1110 for example "A", as a character input if the whole area of the touch input unit 110, including the control area, is the input area 116. Therefore, the control unit 220 may input the character "A" written in part on the scroll bar area 1110 to display at the display area 114.

Figure 12:
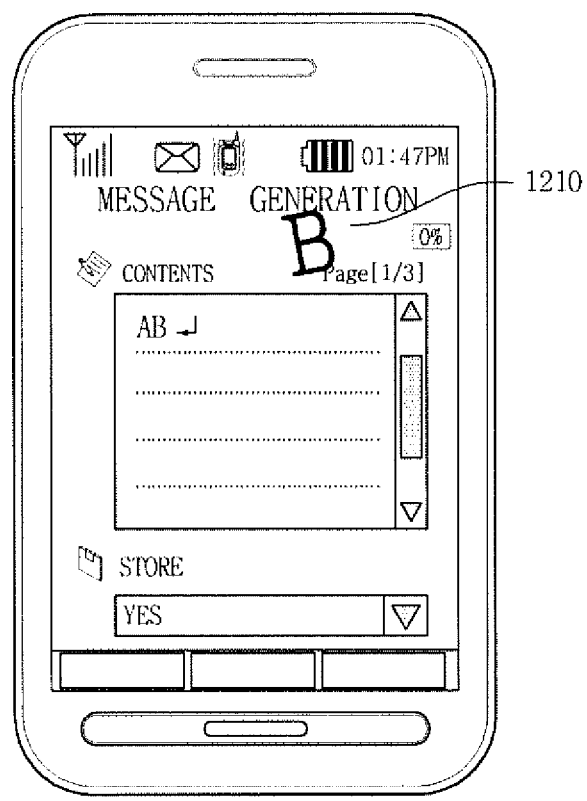
FIG. 12 illustrates a written character extended beyond the displayed input area into an upper end area of a touch input unit.

FIG. 12 illustrates another example of an input character extending beyond the displayed input area into an upper end area. Referring to FIG. 12, even if the user intends to write contents of the message inside the displayed input area, the written script may be written over the border of the displayed input area into an upper end area 1210.

For example, the control unit 220 may recognize the information written across the upper end area 1210, for example "B", as a character input if the whole area of the touch input unit 110, including the upper end area 1210, is the input area 116. Therefore, the control unit 220 may input the character "B" written in part on the upper end area 1210 to display at the display area 114.

Figure 13:
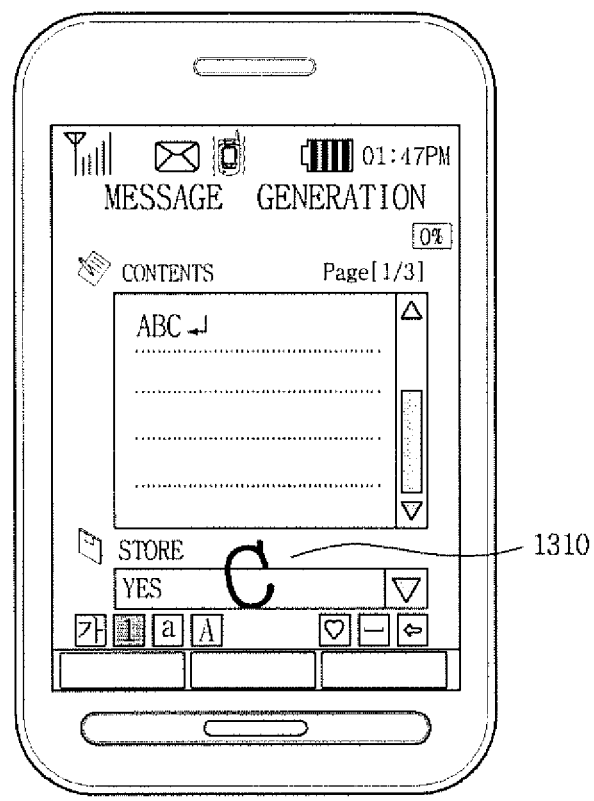
FIG. 13 illustrates a written character extended beyond the displayed input area into a lower end area of the touch input unit.

FIG. 13 illustrates another example when an input character is extended beyond the displayed input area into a lower end area 1310 of the touch input unit 110 when sending a message. Referring to FIG. 13, if the user writes a script over the border of the displayed input area into a lower end area 1310, the control unit 220 may recognize the script written across the lower end area 1310, for example, "C" as a character input to be displayed at the display area 114.

For example, the input area may have a larger area than the display area 114, or may be the whole of the touch input unit 110 including the display area 114.

Figure 14:
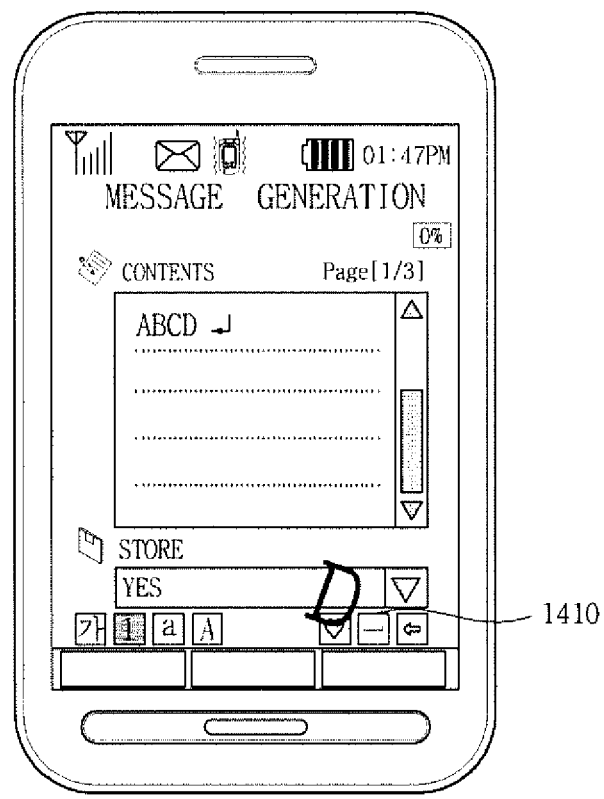
FIG. 14 illustrates another case that a written character is extended beyond the displayed input area into a control area of the touch input unit.

FIG. 14 illustrates yet another example when an input character is extended beyond the displayed input area into the control area 1410.

Referring to FIG. 14, if the user writes a script, for example, "D" over the border of the displayed input area into a control area 1410, the control unit 220 may recognize the script written across the control area 1410 as a character input "D".

In practice, the control unit 220 recognizes a starting touch point of the input area, and adapts the control area 1410 to be used as additional input area if the touched points are extended beyond the input area into the control area 1410.

The control unit 220 may further adapt the control area 1410 to be used as controlling the mobile terminal operations as described above when user inputted data information is not detected for a predetermined period.

For example, even tough the control area 1410 contains menus for setting sizes, types and colors of input information, the control area 1410 may be included in the input area 116 for inputting the information.

With reference to FIGS. 11 to 14 as described above, the information input terminal 100 may have a touch input recognizable area, including the scroll bar area 1110, the upper end area 1210, the lower end area 1310, and the control area 1410, in addition to the displayed input area.

As described above, according to the embodiment of the present invention, the touch information terminal and the method using the same may provide a larger size screen for the touch input device as the screen contains the information input area, the display area and the control area.

According to the embodiment of the present invention, additional key buttons besides the touch input device are not needed for providing a light and compact digital portable terminal. Therefore, a larger size screen can be provided for the touch input device, thereby improving the usability of the digital portable terminal.

The embodiments of the present invention have been described for illustrative purposes, and those skilled in the art will appreciate that various modifications, additions and substitutions are possible without departing from the scope and spirit of the invention as disclosed in the accompanying claims. Therefore, the scope of the present invention should be defined by the appended claims and their legal equivalents.

What is claimed is:

1. A method of controlling a display in a mobile terminal, the mobile terminal comprising a touch screen having a display area including an input area and a control area that are separated from each other, the method comprising:
   displaying at least one application icon on the display area, the at least one application icon including a cursive script application icon for enabling input of cursive script;
   receiving a selection of one application icon of the at least one displayed application icon;
   entering an information input mode based on the selection of the one application icon, wherein an initial screen of the information input mode includes an information input window for displaying information input via the input area and an instruction prompt sign displayed in the information input window, the instruction prompt sign indicating that the information input window is to be touched to activate the information input mode, and wherein the instruction prompt sign is displayed in a form of a blink, a color, a text or an icon;
   displaying a first error sign on the display area to indicate that the information input mode cannot be activated when a region on the touch screen other than the information input window is touched, wherein information received via the input area when the information input mode is not activated is not processed;

activating the information input mode when the information input window including the instruction prompt sign is touched such that information received via the input area can be processed;
receiving first information input via the input area while the information input mode is activated, wherein receiving the first information comprises:
  inserting a cursor at a touched point of the input area for indicating an information input position when a duration of a touch to the touched point is shorter than a threshold time period; and
  determining the touched point as a handwriting input when a duration of a touch to the touched point is longer than the threshold time period;
determining that the received first information is a character via a sign/character recognition algorithm;
displaying the character corresponding to the received information in the information input window;
receiving second information input via the input area after receiving the first information;
recognizing the received second information as an image when the received second information input is not determined as a character;
displaying the image corresponding to the second information with the character corresponding to the first information in the information input window, wherein the displayed image is not a standard image provided by the mobile terminal, and the image and the character are displayed in a substantially same size;
recognizing a first touching manner in at least part of the control area as input data information during the information input mode;
displaying the recognized input data information in the display area such that the input data information is distinguished from graphic icons displayed in the control area for controlling the input data information; and
enabling the control area to be used for controlling a mobile terminal operation when no data information input is recognized for a predetermined duration,
wherein recognizing the first touching manner comprises:
  recognizing the control area as an additional input area when a starting point of the first touching manner is within the input area and the first touching manner extends from the starting point out of the input area and into the control area; and
  recognizing the control area as an area for controlling the mobile terminal when the starting point of the first touching manner is within the control area during the information input mode,
wherein a control function related to the graphic icons is deactivated when the control area is recognized as the additional input area, and
wherein the control function related to the graphic icons is activated when the control area is recognized as the area for controlling the mobile terminal.

2. The method of claim 1, wherein the first touching manner comprises writing on the display area.

3. The method of claim 1, further comprising recognizing a second touching manner in the control area of the display area as activation of a control function associated with touched graphic icons.

4. The method of claim 3, wherein the second touching manner comprises pressing the control area for a predetermined duration or pressing the control area multiple times.

5. The method of claim 1, further comprising displaying a second error sign on the touch screen when a received touch is not recognized as the first touching manner.

6. The method of claim 1, further comprising:
displaying a pop-up message including an instruction prompt during the information input mode, the instruction prompt providing user guidance.

7. The method of claim 1, wherein the at least one displayed application icon comprises a short message service (SMS) application, a schedule managing application, or a memo writing application.

8. The method of claim 1, further comprising:
storing the image in a storage unit.

9. A mobile terminal, comprising:
a touch screen having a display area including an input area and a control area; and
a control unit configured to:
  control the touch screen to display at least one application icon on the display area, the at least one application icon including a cursive script application icon for enabling input of cursive script;
  recognize a selection of one application icon of the at least one displayed application icon;
  enter an information input mode based on the selection of the one application icon,
wherein an initial screen of the information input mode includes an information input window for displaying information input via the input area and an instruction prompt sign displayed in the information input window, the instruction prompt sign indicating that the information input window is to be touched to activate the information input mode, and wherein the instruction prompt sign is displayed in a form of a blink, a color, a text or an icon;
  control the touch screen to display a first error sign on the display area to indicate that the information input mode cannot be activated when a region on the touch screen other than the information input window is touched, wherein information received via the input area when the information input mode is not activated is not processed;
  activate the information input mode when the information input window including the instruction prompt sign is touched such that information received via the input area can be processed;
  recognize first information input received via the input area while the information input mode is activated, wherein receiving the first information comprises:
    inserting a cursor at a touched point of the input area for indicating an information input position when a duration of a touch to the touched point is shorter than a threshold time period; and
    determining the touched point as a handwriting input when a duration of a touch to the touched point is longer than the threshold time period;
  determine that the received first information is a character via a sign/character recognition algorithm;
  control the touch screen to display the character corresponding to the received first information in the information input window;
  recognize second information input via the input area after receiving the first information as an image when the recognized second information input is not determined as a character;
  control the touch screen to display the image corresponding to the second information with the character corresponding to the first information in the information input window, wherein the displayed image is not a standard image provided by the mobile terminal, and the image and the character are displayed in a substantially same size;

recognize a first touching manner in at least part of the control area as input data information during the information input mode; and control the touch screen to display the recognized input data information in the display area such that the input data information is distinguished from graphic icons displayed in the control area for controlling the input data information, wherein the input area and the control area are separated from each other, wherein recognizing the first touching manner comprises:

enabling the control area to control a mobile terminal operation when no input data information is recognized for a predetermined duration;

recognizing the control area as an additional input area when a starting point of the first touching manner is within the input area and the first touching manner extends from the starting point out of the input area and into the control area; and recognizing the control area as an area for controlling the mobile terminal when the starting point of the first touching manner is within the control area during the information input mode, wherein a control function related to the graphic icons is deactivated when the control area is recognized as the additional input area, and wherein the control function related to the graphic icons is activated when the control area is recognized as the area for controlling the mobile terminal.

10. The mobile terminal of claim 9, wherein the first touching manner comprises writing on the display area.

11. The mobile terminal of claim 9, wherein the controller is further configured to recognize a second touching manner in the control area during the information input mode as activation of a control function associated with a touched graphic icon.

12. The mobile terminal of claim 11, wherein the second touching manner comprises pressing the control area for a predetermined duration or pressing the control area multiple times.

13. The mobile terminal of claim 9, wherein the control unit is further configured to control the touch screen to display a second error sign when a received touch is not recognized as the first touching manner.

14. The mobile terminal of claim 9, wherein the control unit is further configured to control the touch screen to display a plurality of menus for setting sizes, types and colors of the displayed input data information in response to a touch input received in the control area.

15. The mobile terminal of claim 9, wherein the input area includes an indicator area for displaying at least an antenna reception power level, a battery capacity level or a message reception indicator.

16. The mobile terminal of claim 9, wherein:

the control unit is further configured to control the touch screen to display a pop-up message including an instruction prompt during the information input mode, the instruction prompt providing user guidance.

17. The mobile terminal of claim 9, further comprising:

a storage unit configured to store information, wherein the control unit is further configured to control the storage unit to store the image.

\* \* \* \* \*